(12) United States Patent
Eriksson Järliden

(10) Patent No.: US 9,367,917 B2
(45) Date of Patent: Jun. 14, 2016

(54) ESTIMATION OF CO-REGISTRATION ERRORS

(71) Applicant: Elekta AB (publ), Stockholm (SE)

(72) Inventor: Andreas Eriksson Järliden, Bromma (SE)

(73) Assignee: Elekta AB (publ), Stockholm (SE)

( * ) Notice: Subject to any disclaimer, the term of this patent is extended or adjusted under 35 U.S.C. 154(b) by 383 days.

(21) Appl. No.: 13/647,513

(22) Filed: Oct. 9, 2012

(65) Prior Publication Data

US 2013/0251218 A1     Sep. 26, 2013

Related U.S. Application Data

(63) Continuation of application No. PCT/EP2012/001299, filed on Mar. 23, 2012.

(51) Int. Cl.
*G06K 9/00*     (2006.01)
*G06T 7/00*     (2006.01)

(52) U.S. Cl.
CPC ..... *G06T 7/0024* (2013.01); *G06T 2207/10072* (2013.01); *G06T 2207/30004* (2013.01)

(58) Field of Classification Search
CPC ... G06T 7/0024; G06T 7/0026; G06T 7/0028; G06T 7/003; G06T 7/0034; G06T 7/0036; G06T 2207/30004; G06T 2207/10072
See application file for complete search history.

(56) References Cited

PUBLICATIONS

"Median", Mar. 5, 2012, Wikipedia.org, https://web.archive.org/web/20120305071653/http://en.wikipedia.org/wiki/Median#Variance, p. 1-9.*

(Continued)

*Primary Examiner* — Stephen R Koziol
*Assistant Examiner* — Timothy Choi
(74) *Attorney, Agent, or Firm* — Sunstein Kann Murphy & Timbers LLP

(57) ABSTRACT

The co-registration error can be estimated by performing a number of additional iterative co-registrations, each iteration having a starting point dictated by the found co-registration transformation, and using a set of initial parameters different to that of the co-registration being tested. The spread in the resulting co-registrations can then be used as the estimate of the co-registration error. The variations in the set of initial parameters can include (i) the candidate transformation which the iteration uses as its starting point, adopting starting points that are offset from the co-registration being tested, (ii) the sample points used for the mutual information metric (or whichever metric is used to optimise the transformation), and (iii) the region-of-interest that is selected. Ideally, all three are varied to some extent within the plurality of additional co-registrations that are performed, and an average value is taken.

7 Claims, 3 Drawing Sheets

(56) References Cited

PUBLICATIONS

Feldmar et al., "Rigid, Affine and Locally Affine Registration of Free-Form Surfaces", 1996, Kluwer Academic Publishers, Int. Journal of Computer Vision 18 (2), p. 99-119.*

Maes et al., "Medical Image Registration using Mutual Information", Oct. 2003, IEEE, Proceedings of the IEEE, vol. 91, iss. 10, p. 1699-1722.*

Gong, et al, A New Method for CT to Flouroscope Registration Based on Unscented Kalman Filter, *Medical Image Computer and Computer-Assisted Intervention*, Jan. 1, 2006—MICCAI 2006 Lecture Notes in Computer Science; LNCS, Springer, Berlin, DE, pp. 891-898, XP019043441, ISBN: 978-3-540-44707-8.

Shams, et al, Efficient Image Registration by Decoupled Parameter Estimation using Gradient-Based Techniques and Mutual Information, *Tencon 2007-2007 IEEE Region 10 Conference, IEEE, PI*, Oct. 30, 2007, pp. 1-4, XP031226131, ISBN: 978-1-4244-1271-6.

European Patent Offfice, Officer Andreas Turine, International Search Report and Written Opinion, PCT/EP2012/001299, date of mailing Dec. 4, 2012, 11 pages.

\* cited by examiner

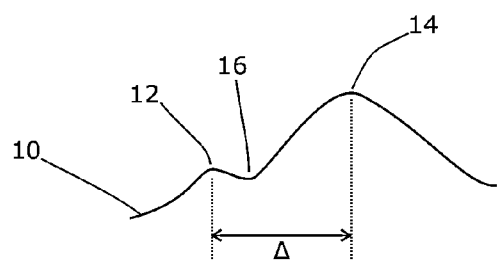
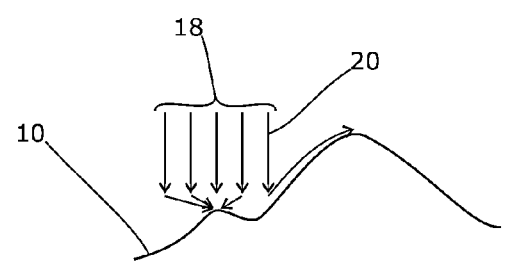
Fig 2a
Fig 2b
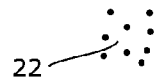
Fig 3a
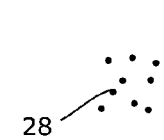
Fig 3b
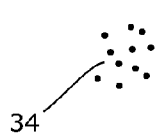
Fig 3c
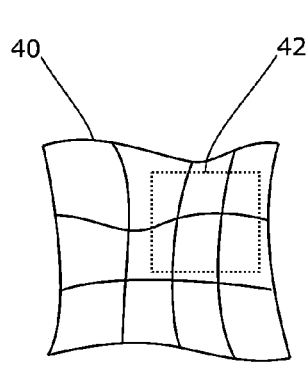
Fig 4a
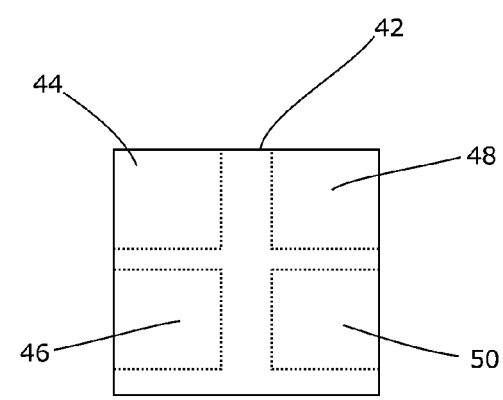
Fig 4b

ESTIMATION OF CO-REGISTRATION ERRORS

This application is a continuation of Patent Cooperation Treaty Patent Application PCT/EP2012/001299, filed Mar. 23, 2012, which is incorporated herein by reference.

FIELD OF THE INVENTION

The present invention relates to the estimation of co-registration errors between pairs of images. It finds particular application in relation to medical imaging, where such errors may adversely affect the efficacy of a treatment planned using the image.

BACKGROUND ART

Image co-registration is the process of determining a geometric transformation that needs to be applied to one (or more) images of a plurality of images of the same thing so as to bring them into register, i.e. so that the image features are located in the same place within the field of view on all the images. For a rigid registration, the transformation may involve translation and/or rotation, and may thus have up to 3 or 6 degrees of freedom for two- and three-dimensional image pairs respectively. A more general transformation may allow scaling and shear as well as translation and rotation, thus allowing 12 degrees of freedom in three dimensions, or may be more complicated still. In a medical context the image features will usually be anatomical features visible in the respective images. The images can then be combined to produce a composite image containing detail from both (or all) the individual images.

Two categories of image registration exist; landmark based registration and intensity based registration. With landmark based methods, the user either manually selects landmarks (e.g. artificial fiducials or anatomical landmarks) in both images, or landmarks are automatically detected, and the two sets of landmarks are then registered. Intensity based registration, on the other hand, uses a distance measure which is directly determined based on the intensities of the two images, to measure the level of agreement between the two images given a tentative registration transformation. Registration using Mutual Information is a common example of intensity based registration. Image registration is typically carried out by an automated iterative process which seeks to minimise the differences between the images. The quality of the result is then assessed visually by a suitably experienced operator.

Co-registration of medical images allows direct comparison between the images, fusion of the images, or the use of non-stereotactic images for stereotactic purposes. Most treatment planning applications (such as for radiotherapy applications) have support for image co-registration.

SUMMARY OF THE INVENTION

Studies of intensity based co-registration errors exist, but these are focused on retrospectively measuring the overall accuracy of a particular registration algorithm in general, i.e. by taking into account a large number of historic co-registrations, comparing the results of these to a stereotactic registration, and determining the error rate in order to ascertain how efficient that algorithm generally is. This yields an assessment as to the average performance of a co-registration algorithm over a large number of individual co-registrations. Such studies do not seem to allow an online (i.e. real-time) estimate of the accuracy of a specific co-registration. Thus, they help in making a decision as to which of a number of competing algorithms should be implemented, but offer no help in deciding whether a specific co-registration transformation is a reliable one. Such an estimate could usefully be provided to an operator prior to using the co-registered images for treatment planning, and would inform them as to how confident they could be in using the co-registration.

The present invention seeks to provide such an on-line estimate of the co-registration error between two images. It is particularly beneficial for intensity based methods, as such estimates are not currently available.

The invention estimates the co-registration error (or, alternatively, the uncertainty in the co-registration) by performing a number of additional iterative co-registrations, each iteration having a starting point dictated by the found co-registration transformation, and using a set of initial parameters different to that of the co-registration being tested. The spread in the resulting co-registrations is then used as the estimate of the co-registration error.

A suitable measure of the spread is to use an average length of the offsets, preferably an arithmetic average that is not disproportionately affected by a small number of errant results, such as the median.

The variations in the set of initial parameters can include (i) the candidate transformation which the iteration uses as its starting point, adopting starting points that are offset from the co-registration being tested, (ii) the sample points used for the mutual information metric (or whichever metric is used to optimise the transformation), and (iii) the region-of-interest that is selected. Ideally, all three are varied to some extent within the plurality of additional co-registrations that are performed, and an average value is taken.

Thus, the present invention provides a treatment planning apparatus comprising at least one processor arranged to iteratively determine a co-registration transformation between a first image and a second image on the basis of a set of initial parameters, wherein the apparatus is arranged to employ the at least one processor to determine a first co-registration transformation between the first image and the second image on the basis of a first set of initial parameters, and estimate the error in the first co-registration transformation. The error can be estimated by employing the at least one processor to determine a plurality of additional co-registration transformations, each additional determination having an iterative starting point based on the first co-registration transformation and using a set of initial parameters that differ from the first set of initial parameters, measuring the variation in at least the additional co-registration transformations.

In this way, a treatment planning apparatus can co-register two images and also present the user with a measure of the degree of confidence that can be expressed in relation to that co-registration. A user can take this into account when deciding whether to use the co-registration as proposed, adjust the co-registration manually, or seek further (better quality) images for use in treatment planning.

The variation can be measured by determining an average length of the vector differences of the additional co-registration transformations. The length of the vector differences is easiest measured as the length of the difference between that additional co-registration transformation and the first co-registration transformation. The average is preferably calculated as the median value of the lengths, although other forms of averaging may be used, for example if only a small number of additional co-registrations are performed.

The set of initial parameters for the additional co-registration transformations can differ from the first set of initial parameters in several ways, as noted above. One way is to begin the iteration at a new candidate transformation, one that is neither the previous starting point nor the first co-registration transformation itself. An example is to use a group of candidate transformations calculated as being the first co-registration transformation plus an offset. In this way, the iteration should be short, as is it starting very near to what is believed to be close to the actual optimum transformation, but may escape a local minima in which the first co-registration became trapped.

Another way is to vary the data sample. Most treatment planning apparatus determine a co-registration transformation on the basis of a subset of the image data of the first and second images, usually a set of pseudo-randomly chosen pixels. The set of initial parameters for some of the additional co-registration transformations can differ from the first set of initial parameters in respect of the subset of the image data that is used, such as by choosing a new pseudo-random set of pixels. These additional co-registrations can start their iteration at the first co-registration transformation, to minimise the computation time.

Alternatively, the region of interest can be varied. Again, most treatment planning apparatus allow the user to select a region of interest from the image output of the investigative apparatus; that selected region forms the first and/or the second image. The additional co-registration transformations can be based on a still further selection from within the first image and/or the second image.

Typically, the first image and the second image are three-dimensional. However, the invention is applicable in principle to the co-registration of images in any number of dimensions, such as four or two.

BRIEF DESCRIPTION OF THE DRAWINGS

An embodiment of the present invention will now be described by way of example, with reference to the accompanying figures in which;

FIGS. 2a and 2b illustrate the estimation of optimiser errors;

FIGS. 3a, 3b and 3c illustrate the estimation of sampling-related MI metric errors;

FIGS. 4a and 4b illustrate the estimation of local distortion-related errors.

DETAILED DESCRIPTION OF THE EMBODIMENTS

Figure 1B:
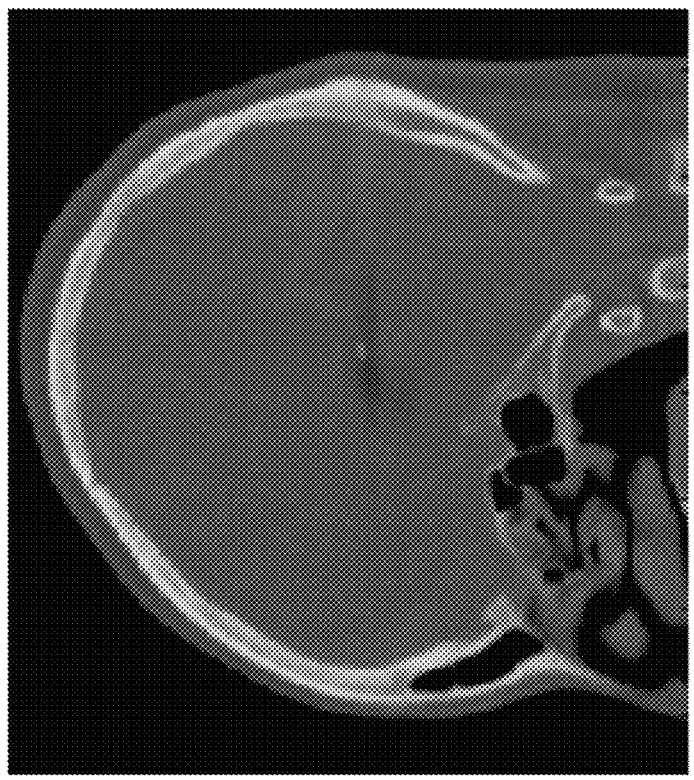
FIGS. 1a and 1b show a pair of candidate images for co-registration, FIG. 1a being an MRI image of a patient's head and FIG. 1b a CT image of the same patient's head.
Figure 1A:
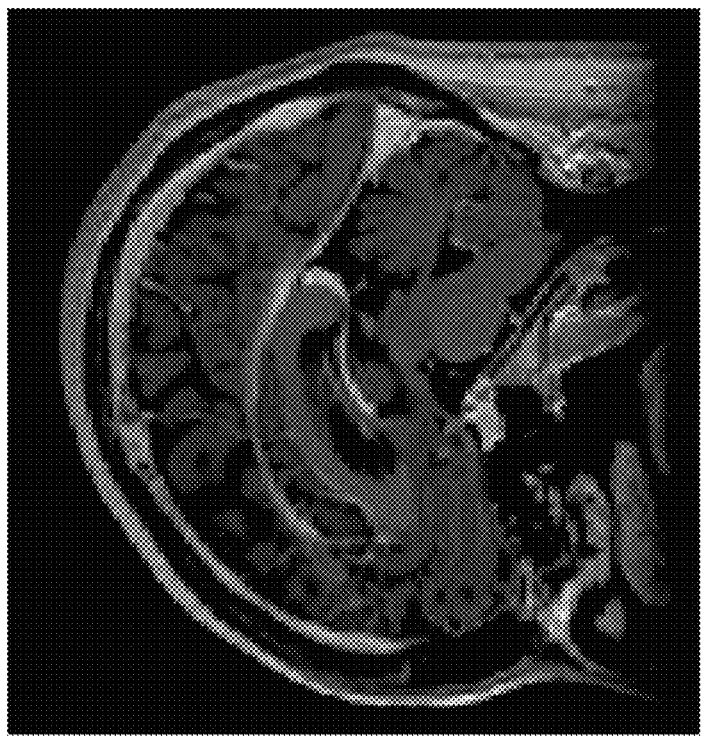

FIGS. 1a and 1b show a pair of images, being an MRI scan (FIG. 1a) and a CT scan (FIG. 1b) of the head of the same patient. It should be noted that both FIGS. 1a and 1b are two-dimensional (of necessity) but are a section through a larger three-dimensional volume image. When referring to an "image" in this application, we mean the three-dimensional image, although the techniques disclosed herein are applicable to images with greater or lesser numbers of dimensions, such as two-, one- or four-dimensional images. Where we describe techniques in relation to a small number of dimensions (for reasons of simplicity) the techniques can be extended in a conceptually straightforward manner to three or four dimensions.

Whilst the two images are recognisably (to the human eye) of the same thing, they contain different detail as a result of the different imaging modalities involved. However, there are a number of shared structures in the image, i.e. image features that are correlated. The degree to which these shared structures exist and overlap can be measured by calculating a "mutual information" ("MI") value. Mutual information is described at http://en.wikipedia.org/wiki/Mutual information, and reflects the degree to which the pixel values of one image can be predicted if the pixel values of the other image are known. The assumption is that the Mutual Information is maximized when the images are correctly registered. Calculating the MI value requires an input in the form of the two images and the transformation relationship between them (which may be an estimated or candidate relationship, i.e. one subject to refinement). In theory, for each pixel of the first image, the transformation relationship is applied to the pixel location to find the corresponding location on the second image. Where that corresponding location is at the centre of a pixel in the second image, the pixel value of the first image is compared to that pixel value of the second image. Where that corresponding location is not at the centre of a pixel in the second image, the pixel value of the first image is compared to an interpolated pixel value derived from the pixels of the second image that lie around the corresponding location. This yields a large number of pairs of pixel values, and the correlation between these pixel value pairs is determined. This is the MI value for that transformation relationship. Other metrics exist to measure the quality of a candidate registration, such as the chamfer metric, cross-correlation and sum of squared differences.

This process can then be repeated iteratively, adjusting the transformation relationship at each iteration so as to maximise the MI value. Once a maxima has been located, the transformation relation yielding that MI value is deemed to be the optimal relationship and one or both images can be transformed in line with that relationship in order to bring them into registration.

Clearly, for a pair of three-dimensional images each having a high resolution, related by an (initially) unknown transformation having six degrees of freedom (3 translational and 3 rotational), this process will involve an impractically large amount of computation. A shortcut needs to be located, and the principal one that is adopted is to select a random distribution of sample pixels in one image to use for comparison, rather than all the pixels. This reduces the computational load correspondingly.

Thus, in this way an "optimal" transformation is determined which is presented to the user as "the" relationship between the images that allows them to be registered. The present invention wishes to calculate, in addition, a confidence value for that relationship, reflecting the likely degree of error in the relationship calculated for the image pair concerned.

We have determined that the total registration error in an implementation of a standard (non-deformable) mutual information registration is typically made up of the following three parts;

1. The optimisation error: the optimisation process fails to find the true optimum, most often because the metric is slightly noisy and very shallow near the optimum. Therefore, the optimizer can be trapped in a local optimum that is near to but not co-incident with the true optimum.

2. The mutual information approximation error: the MI metric is only an approximation of the true MI because of errors arising from the need to interpolate, and from the use of fewer than all the pixels for comparison. These will cause an error even if a perfect optimiser were to be used.

3. Image distortion errors: non-rigid distortions in the images (and deformations in the patient) cannot be compensated for by a rigid registration algorithm and will therefore create local errors.

Error (1) can be estimated by performing several local optimizations, each starting from a random state near the optimum selected by the registration algorithm. These optimization would use (for example) a gradient descent optimizer (perhaps with a fixed step size and a relatively strict limit on the number of steps). These optimizations are local (not stochastic like the simulated annealing process typically used for finding the "optimal" solution that is being assessed) and start close to the optimum, and therefore they should run quickly and can be done online. As they use a different starting point, these local optimizations are all likely to find different local optima close to the true optimum. The spread in the different optima should therefore reflect the magnitude of error (1). It will also partially reflect error (2), since the different local optima result from the noise in the metric introduced by (2).

For a registration that only involves translations, the spread in the optima is easy to translate into an error estimate. Take the median length of the difference in translations between the initial co-registration and the additional co-registrations. This gives the user a single value that describes the magnitude of the error (e.g. 0.3 mm). Of course, one could also look at each degree of freedom separately and present the spread in x, y and z. As an alternative to the median length, any of the mean length, the maximum length, the 90% confidence level length, etc could be employed.

With rotational degrees of freedom or other transformations such as shear, etc, the measurement is a little more complex since we are now mixing length with angles. Rotational errors will affect points far from the centre of rotation more than points close to the centre of rotation. One option is of course to present separate estimates along each Degree of Freedom. Another straightforward solution is to select a number of representative locations within the first image, transform these locations with the initial and additional registration transformations, and measure the resulting translational spread in the transformed points.

In the secondary use of this technique in which the median of the initial and the additional co-registrations is used as the final registration transformation, the relevant measure is of course difference between all the transformations and that median transformation, instead of the difference between the additional and the first.

FIG. 2a illustrates the potential problem. The line 10 shows the variation in the MI output (y-axis) with a variation in the transformation (x-axis). Many algorithms will yield a local solution, exemplified as peak 12, and miss the true optimum solution 14 as a result of the intervening local minimum 16. This results in a divergence Δ between the reported optimum solution and the actual optimum solution. Restarting the optimisation at a series of nearby locations 18 will result in a corresponding series of freshly-calculated solutions, some of which (20) may escape the local maximum and reach a different solution. It should be noted that this different solution may or may not be the actual, true optimum, and may or may not be a better solution than the reported optimum solution. However, the number of different solutions found in this way and the divergence between them effectively illustrates the degree to which the solution is at risk of inaccuracy due to local maxima.

In FIGS. 2a and 2b, we show the relationship between the co-registration transformation and the MI value as a graph. This is of course a simplification for the purpose of illustration in a two-dimensional figure. The rigid co-registration transformation between two three-dimensional images is a vector quantity with six degrees of freedom, and can thus be visualised as a point in six-dimensional space. The MI value associated with each location on that six-dimensional space then adds a seventh dimension, and the problem in finding the optimum transformation is simply one of finding the peak on the multi-dimensional surface that is thus created. FIGS. 2a and 2b illustrate taking a two-dimensional section through the seven-dimensional space, the y-axis corresponding to the MI dimension and the x-axis corresponding to a variation in the proposed co-registration transformation.

Error (2) can be estimated by performing the local optimizations described above, using different random distributions of sample pixels within the image(s). If the optimum transformation chosen by the process is sensitive to the specific sample of pixels that is used, then there with be a large spread in the transformations thus derived, indicating a high degree of uncertainty.

This is illustrated in FIGS. 3a, 3b and 3c. FIG. 3a shows a first random (or pseudo-random) selection of pixels 22 from one image that are used for the comparison process in calculating the MI metric (described above). When based on that subset of pixels, the MI metric varies with the co-registration transformation as shown at 24. This is a noisy relationship, unlike the idealised relationship shown in FIGS. 2a and 2b, as the dataset that is being used to generate it is incomplete for the reasons shown above. Nevertheless, a maximum 26 is discernible and the co-registration algorithm will seek that maximum.

FIG. 3b shows a different selection of pixels 28, and the corresponding relationship 30 between the MI metric and the co-registration transformation. This relationship is the same underlying curve (or surface, in more dimensions) to which a different pattern of noise has been superimposed. As a result, the apparent maximum 32 is at a different location to the previous maximum 26.

FIG. 3c shows a third selection of pixels 34, with a further and slightly different corresponding relationship 36 between the MI metric and the co-registration transformation. Again, the same underlying curve (or surface) with a still further different pattern of noise has an apparent maximum 38 is at a still different location to that of the previous maxima 26, 32.

This is a manifestation of the signal-to-noise ratio within the MI metric. If the ratio is high then individual local peaks caused by the noise arising from the sampling and interpolation processes can appear to be significant in relation to the "actual" maximum within the theoretically-perfect MI metric that might result from using every pixel and without needing to use interpolation. A large signal-to-noise ratio will have more of an influence on the resulting choice of optimum transformation, meaning that random changes in that noise will have a correspondingly large effect. The choice of a new selection of sampling points will create such a random change in the noise pattern, and hence re-optimising the transformation one or more times, around the previously-discovered optimum location, will yield a set of new solutions. The average distance between those solutions will indicate the influence of the noise relative to the signal. This average could be the mean or the median, depending on the number of re-optimising processes that are run.

Of course, it will not usually be the case that the entire relationship between the MI metric and the co-registration transformation will be computed. In practice, the algorithm typically samples the relationship at a number of places as it iteratively works towards the maximum. FIGS. 3a to 3c show a complete two-dimensional section through the relationship for clarity and explanatory purposes.

Error (3) can be estimated by using different sub-ROIs (regions of interest) of the original region of interest chosen for the original optimisation. These sub-ROIs should not be too small, since they might then contain too few features to allow a meaningful co-registration (for example, they might only contain air, or they may differ only slightly along a certain axis). They do however need to be appreciably smaller that the whole ROI so that an appreciably different optimisation is carried out. A reasonable compromise is to select the 8 sub-ROIs of the original ROI that arise from dividing the original ROI into two along each axis. Repeating the optimisation for each of the 8 sub-ROIs will produce a spread of different transformations; if there is a local distortion in one area of either image then this should affect one or more of the 8 sub-ROIs more than the remaining sub-ROIs, and thus the degree of divergence in the transformations arrived at offers a measure of the degree of non-rigid distortion in the images. The difference between the transformations will be an estimate of the mean distortion, however.

FIG. 4a shows a hypothetical form of distortion of one or both images 40, and the region of interest (ROI) 42. Such distortion removes the linear relationship between a location in the image and a location in the real-world object being imaged. Assuming that the distortion is not identical between the two images being co-registered, this in turn means that the true registration vector between the two images varies as a function of the location within the images. The co-registration algorithm is however seeking a single vector and will thus arrive at a compromise.

If the ROI 42 is divided into several sub-ROIs 44, 46, 48, 50, as shown in FIG. 4b, then the distortion will be different in each sub-ROI and the result of the co-registration algorithm will reflect a different compromise. As before, the variation in those results will indicate the level of non-linear distortions in the image.

In summary, the invention estimates the co-registration error by performing a number of additional co-registrations, each starting from random small offsets from the found co-registration transformation while using a different set of initial parameters. The spread in these co-registrations is then used as the estimate of the co-registration error. A suitable measure of the spread is to use an average length of the offsets, preferably an arithmetic average that is not disproportionately affected by a small number of errant results, such as the median.

The variations in the set of initial parameters can include the candidate transformation at which the iteration is commenced, the sample points used for the mutual information metric (or whichever metric is used to optimise the transformation), and the region-of-interest that is selected. Ideally, all three are varied to some extent within the plurality of additional co-registrations that are performed, and an average value is taken.

Figure 5:
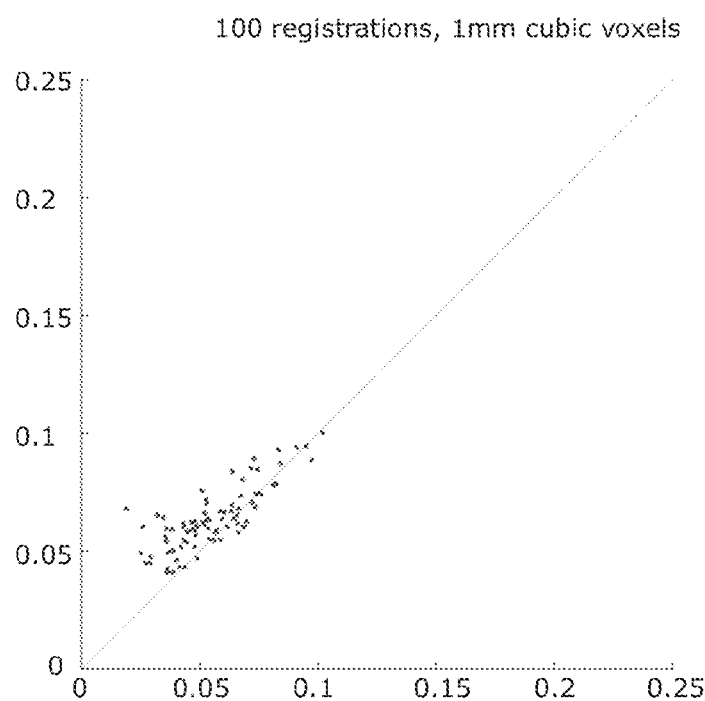
FIGS. 5 and 6 show the estimated error versus real errors using implementations of the present invention.
Figure 6:
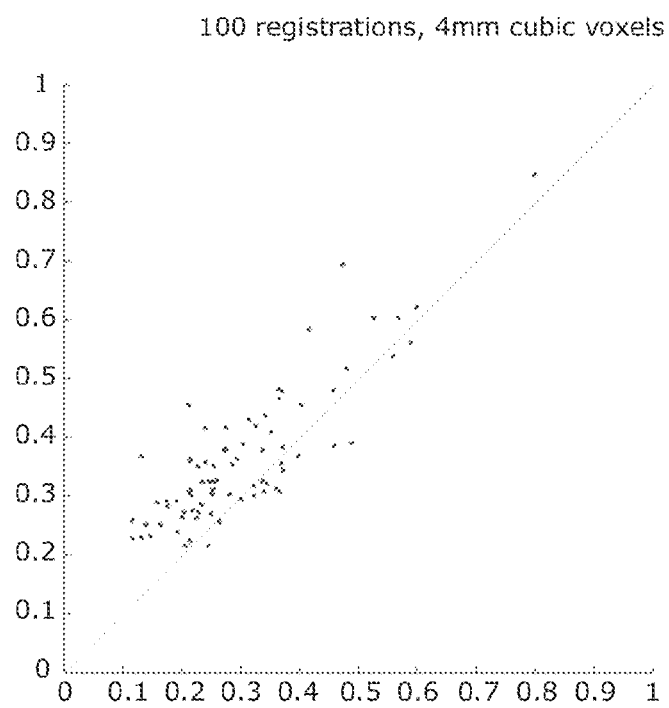

FIGS. 5 and 6 show the estimated error (y-axis) versus real errors (x-axis) using prototype implementations of the invention. 100 image pairs were used, each of which were artificially generated T1 and T2 MR images using the BrainWeb MR simulator. This means that the perfect or ideal registration vector is known, although the images do not include any local distortions. FIG. 2 shows the result using images with cubic 1 mm voxels, and FIG. 3 shows the result using images with 4 mm voxels.

A secondary use of this technique is to use the various co-registrations prepared as part of the estimation of the accuracy of the original co-registration transformation to improve the accuracy of that overall registration. By using the median of all the resulting co-registrations, the actual error can be reduced to about 50% of the original error.

It will of course be understood that many variations may be made to the above-described embodiment without departing from the scope of the present invention.

The invention claimed is:

1. A treatment planning apparatus comprising:
at least one processor arranged to iteratively determine a co-registration transformation between a first image and a second image on the basis of a set of initial parameters which includes selecting a random distribution of sample pixels in one image to use for the determination;
wherein the apparatus is arranged to:
employ the at least one processor to determine a first co-registration transformation between the first image and the second image on the basis of a first set of initial parameters;
employ the at least one processor to determine a plurality of additional co-registration transformations, each additional determination having an iterative starting point based on the first co-registration transformation, and using a set of initial parameters that differ from the first set of initial parameters; and
measure the variation in at least the additional co-registration transformations so as to estimate an error in the first co-registration transformation, in which the set of initial parameters for at least one of the additional co-registration transformations differs from the first set of initial parameters at least in respect of: a candidate transformation which the iteration uses as its starting point; by a selection of the random distribution of sample pixels, and by using only a sub-region of at least one of the first image and the second image.

2. A treatment planning apparatus according to claim 1 in which the variation is measured by determining an average length of vector differences of the additional co-registration transformations.

3. A treatment planning apparatus according to claim 2 in which the length of the vector difference for each additional co-registration transformation is the length of the difference between that additional co-registration transformation and the first co-registration transformation.

4. A treatment planning apparatus according to claim 2 in which the average length is calculated as the median value of the lengths.

5. A treatment planning apparatus according to claim 1, in which the candidate transformation is calculated as one that is equal to the first co-registration transformation plus an offset.

6. A treatment planning apparatus according to claim 1, in which the at least one processor is arranged to iteratively determine a co-registration transformation on the basis of a subset of the image data of the first and second images, and in which the set of initial parameters for at least one of the additional co-registration transformations differs from the first set of initial parameters in respect of at least a selection of the subset of the image data.

7. A treatment planning apparatus according to claim 1 in which the first image and the second image are three-dimensional.

* * * * *